United States Patent [19]
Onwumere et al.

[11] Patent Number: 5,491,210
[45] Date of Patent: * Feb. 13, 1996

[54] THERMALLY REVERSIBLE POLYMERS

[75] Inventors: Fidelis C. Onwumere, Norcross; Jose F. Pazos, Roswell, both of Ga.

[73] Assignee: Kimberly-Clark Corporation, Neenah, Wis.

[*] Notice: The portion of the term of this patent subsequent to Sep. 10, 2008, has been disclaimed.

[21] Appl. No.: 341,513

[22] Filed: Apr. 21, 1989

[51] Int. Cl.$^6$ .......................... C08G 18/50; C08G 18/61
[52] U.S. Cl. ............................... 528/28; 528/76
[58] Field of Search ..................... 528/76, 80, 83, 528/28

[56]  References Cited

U.S. PATENT DOCUMENTS

| | | | |
|---|---|---|---|
| 2,907,719 | 10/1959 | Greenlee | 528/76 |
| 2,907,745 | 10/1959 | Greenlee | 528/76 |
| 3,011,997 | 12/1961 | DeWitt | 528/76 |
| 3,679,631 | 7/1972 | Mayes | 528/83 |
| 3,682,861 | 8/1972 | Radlmann et al. | 260/47 |
| 3,899,467 | 8/1975 | Bonk et al. | 260/47 |
| 3,901,852 | 8/1975 | Shab | 260/47 |
| 3,909,497 | 9/1975 | Hendry et al. | 260/77.5 |
| 3,931,117 | 1/1976 | Leonard | 260/77.5 |
| 3,954,718 | 5/1976 | Swidler | 260/77.5 |
| 4,008,192 | 2/1977 | Mijs et al. | 260/18 |
| 4,055,550 | 10/1977 | Panandiker et al. | 260/77.5 |
| 4,055,551 | 10/1977 | Panandiker et al. | 260/77.5 |
| 4,069,208 | 1/1978 | Hoeschele | 260/75 |
| 4,160,749 | 7/1979 | Schneider et al. | 260/2.3 |
| 4,201,853 | 5/1980 | Henry et al. | 528/85 |
| 4,281,089 | 7/1981 | Pazos | 525/456 |
| 4,371,684 | 2/1983 | Quiring et al. | 528/65 |
| 4,374,181 | 2/1983 | Blegen | 528/80 |
| 4,403,086 | 9/1983 | Holubka et al. | 528/45 |
| 4,410,679 | 10/1983 | Holubka et al. | 528/45 |
| 4,762,888 | 8/1988 | Sun et al. | 525/125 |
| 4,767,825 | 8/1988 | Pazos et al. | 525/408 |
| 4,851,498 | 7/1989 | Hawkins | 528/173 |
| 4,879,178 | 11/1989 | Sun et al. | 428/355 |
| 4,956,439 | 9/1990 | Tong et al. | 528/80 |
| 5,047,456 | 9/1991 | Onwumere et al. | 528/76 |

FOREIGN PATENT DOCUMENTS 1081406  8/1967  United Kingdom .

OTHER PUBLICATIONS

"Thermally Reversible Urethanes", Department of Chemistry, University of Florida, Gainesville, Florida, Kenneth B. Wagener and Mark A. Murla, Feb. 15, 1988.

May 4, 1988, 2 page letter to Dr. Bernard Cohen from K. B. Wagener, Department of Chemistry, University of Florida, Gainesville, Florida.

"A Novel "Apparent Sublimation" of a Polymer" Kinstle & Sepulveda Polymer Letters Edition vol. 15 pp. 467–469 (1977).

"Thermal Dissociation of Urethanes" Yuhsuke Kawakami Polymer Journal vol. 13 No. 4 pp. 343–349 (1981).

"Blocked Isocyanates" Zeno W. Wicks Jr. Progress in Organic Coatings 3(1975) pp. 73–99.

"Preparation of New Blocked Diisocyanate for Dental Application" G. Y. Lei et al. Journal of Polymer Science: Part A: Polymer Chemistry vol. 25 607–615 (1987).

"Thermally Reversible Urethanes" K. B. Wagener–M. A. Murla Dept. of Chemistry Univ. of Florida, Feb. 15, 1988.

D. C. Allport and W. H. Janes (eds.), *Block Copolymers*, Applied Science Publishers Ltd., 1973, pp. 244–249.

S. Petersen, *Annalen*, 562, 205 (1949) (Chemical Abstracts, vol. 44, cols. 115–118).

Y. Iwakura and K. Hayashi, *Yuki Gosei Kagaku Kyokai Shi*, 16, 533 (1958).

Primary Examiner—James J. Seidleck
Assistant Examiner—Rabon Sergent
Attorney, Agent, or Firm—Karl V. Sidor

[57]  ABSTRACT

The invention provides a polymer adapted for use in melt processes, the polymer having a thermally reversible bond which is adapted to evanesce at an elevated temperature and revert to a thermally reversible bond upon cooling to ambient temperature so that the polymer is adapted, upon being heated to the elevated temperature, to dissociate into melt processable polymeric fragments and, upon being cooled to ambient temperature, to re-associate. The thermally reversible bond is a bond that is capable of evanescing at a temperature which is lower than the degradation temperature of the polymer fragments. The thermally reversible bond may be, for example, a thermally reversible aromatic urethane bond.

1 Claim, No Drawings

THERMALLY REVERSIBLE POLYMERS

FIELD OF THE INVENTION

The present invention relates to thermoplastic polymers and a method of making the same.

BACKGROUND OF THE INVENTION

Aromatic urethane bonds are known to evanesce at elevated temperatures leaving behind aromatic alcohols and aromatic isocyanates. This phenomenon is used to form water-based urethane coatings that are stable at room temperature. Such coatings contain isocyanates which have been reacted with a material such as, for example, phenol, to create a reversible aromatic urethane bond. Isocyanates that are blocked in this manner are unable to react at room temperature with compounds that normally react with isocyanates but will react at temperatures which cause the aromatic urethane bond to evanesce.

Plastic products requiring strength and toughness are typically formed from high molecular weight polymers. Those polymers usually have low melt flow rates and are normally processed at temperatures near the polymer's degradation temperature to improve processability. The resulting products may contain polymers that are partially degraded causing a loss of desired physical properties. In some situations, high molecular weight polymers may be partially degraded by overheating to increase the melt flow rate of the polymer to a useful range for processing.

DEFINITIONS

As used herein, the term "thermally reversible bond" refers to a chemical bond which is capable of evanescence and reversion such as, for example, an aromatic urethane bond. Generally speaking, evanescence and reversion of a thermally reversible bond is an equilibrium process. Above a threshold temperature, evanescence of the bond is favored. Below a threshold temperature, reversion of the bond is favored. The temperature of evanescence and reversion of a thermally reversible aromatic urethane bond may be altered by substituting electron donating or electron withdrawing substituents at a location where they are capable of donating electrons to or withdrawing electrons from the thermally reversible bond.

As used herein, the term "soft segment" refers to an amorphous or slightly crystalline portion of a polymer. Typical soft segments may be formed from aliphatic polyethers or aliphatic polyesters having molecular weights from about 500 to about 25,000. Other soft segments may be formed from, for example, polyethylene glycol, polytetramethylene ether glycol, hydroxyl-terminated polyesters, polypropylene glycols, hydroxyl-terminated polydimethylsiloxanes, polyesters, nylons/polyamides, polyolefins, polycarbonates and polyureas.

As used herein, the term "hard segment" refers to a glassy or highly crystalline portion of a polymer, the portion being formed from molecules that are substantially rigid and symmetrical. A hard segment may be formed from, for example, a short chain oligomer of a polyurethane or polyurea. A hard segment may contain molecules which are bridged by a thermally reversible bond that evanesces upon exposure to heat.

As used herein, the term "thermally reversible polymer" refers to a polymer formed by the chemical union of at least two soft segments by a hard segment that includes a thermally reversible bond. A thermally reversible polymer may contain additional soft segments that are united by one or more hard segments that do not have a thermally reversible bond.

As used herein, the term "polymer fragment" refers to a piece of polymer formed upon the evanescence of a thermally reversible bond of a thermally reversible polymer. A polymer fragment includes at least one soft segment and a part of the hard segment that, prior to evanescence, adjoined the thermally reversible bond.

As used herein, the term "degradation temperature" refers to the temperature at which chemical bonds evanesce in an irreversible manner because of irreversible chemical reactions.

As used herein, the term "low molecular weight" refers to a polymer or polymer fragments having a number average molecular weight less than about 40,000 as determined by gel permeation chromatography. Molecular weights were determined utilizing a Beckman Model 112 Solvent Delivery System (Beckman Instruments, Inc., Fullerton, Calif.), a Beckman Model 421 System Controller, and Waters 500, $10^3$, and $10^4$ Angstrom µStyragel columns (Waters Chromatography Division, Millipore Corporation, Milford, Mass.) in chloroform, HPLC-grade (Burdick and Jackson Laboratories, Inc., a subsidiary of American Hospital Supply Corporation), equilibrated at 30 degrees Centigrade. Sample peaks were measured using a Waters Model 410 Differential Refractometer. Calibration curves were constructed using standards having molecular weights in the range from 600 to 600,000; below about 18,000 the standards were polyethylene glycols from American Polymer Standards, Mentor, Ohio and above about 18,000, the standards were poly(ethylene oxide) standards from Polymer Laboratories, Inc., Stow, Ohio. Data acquisition was performed with a Nelson Analytical Model 760 Interface and an IBM Personal Computer AT (IBM Corporation, Endicott, N.Y.), operating Nelson Analytical GPC Software, Version 3.6 (Nelson Analytical, Cupertino, Calif.).

As used herein, the term "high molecular weight" refers to a polymer or polymer fragments having a number average molecular weight of at least about 40,000 as determined by gel permeation chromatography. For example, high molecular weight polymer may have a number average molecular weight of from about 50,000 to about 500,000.

As used herein, the term "melt process" refers to methods of forming products from molten thermoplastic polymers. Exemplary methods include meltblowing, spunbonding and film extrusion. Meltblowing processes are disclosed in, for example, U.S. Pat. No. 3,849,241 to Butin. Spunbonding processes are disclosed in, for example, U.S. Pat. No. 4,340,563 to Appel et al. and U.S. Pat. No. 3,692,618 to Dorschner et al. These patents are hereby incorporated by reference.

The term "melt flow rate" as used herein refers to the weight of material that flows through an orifice at a given temperature over a specified period of time. The melt flow rate is expressed in units of weight divided by time (i.e., grams/10 minutes). The melt flow rate was determined by measuring the weight of thermally reversible polymer under a 2.160 kg load that flowed through an orifice diameter of 2.0995±0.0051 mm during a specified time period such as, for example, 10 minutes at a specified temperature such as, for example, 180° C. as determined in accordance with a slightly modified version of ASTM Test Method D1238-82, "Standard Test Method for Flow Rates of Thermoplastic By Extrusion Plastometer," using a Model VE 4-78 Extrusion Plastometer (Tinius Olsen Testing Machine Co., Willow Grove, Pa.). The modifications were as follows: (1) the sample was predried at ambient temperature under reduced pressure prior to loading; (2) the piston was not preheated; (3) the sample was loaded in 2–3 minutes; and (4) the loaded sample was preheated for 5 minutes.

As used herein, the term "chain extender" refers to an aromatic or aliphatic compound capable of reacting with at least two isocyanate terminated polymers units to form a polymer chain. Exemplary chain extenders may be aromatic or aliphatic compounds which are terminated with more than one hydroxyl or amine groups. If a chain extender is used to form a thermally reversible aromatic urethane bond, at least one of the functional groups of the chain extender should be a hydroxyl group attached directly to an aromatic ring.

As used herein, the term "polymer" generally includes, but is not limited to, homopolymers, copolymers, such as, for example, block, graft, random and alternating copolymers, terpolymers, etc., and blends and modifications thereof. Furthermore, unless otherwise specifically limited, the term "polymer" shall include all possible geometrical configurations of the material.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

The present invention addresses problems associated with melt-processing high molecular weight polymers by providing a polymer adapted for use in melt processes, the polymer having a thermally reversible bond which is adapted to evanesce at an elevated temperature and revert upon cooling to ambient temperature so that the polymer is adapted, upon being heated to the elevated temperature, to dissociate into melt processable polymeric fragments and, upon being cooled to ambient temperature, to re-associate.

The thermally reversible polymer may be melt-processed to form materials having the valuable physical properties of high molecular weight polymers such as strength and toughness, while having the useful melt-processing characteristics of low molecular weight polymers such as high melt flow rates at low temperatures.

According to the present invention, the thermally reversible polymer contains at least two soft segments joined by a hard segment that includes a thermally reversible bond. A thermally reversible polymer may contain additional soft segments that are united by one or more hard segments that may or may not have additional thermally reversible bonds. The thermally reversible bond should be capable of evanescing at an elevated temperature which is lower than the degradation temperature of the polymer fragments. The thermally reversible bond may be, for example, an aromatic urethane bond.

Polymers that have a thermally reversible aromatic urethane bond typically contain from about 50 percent to about 98.5 percent, by weight, of a soft segment and from about 1.5 percent to about 50 percent, by weight, of a hard segment.

The soft segment may be formed from hydroxyl terminated polymers and amine terminated polymers. The hydroxyl terminated polymer may be, for example, one or more of polyethylene glycol, polyethylene adipate diol, polytetramethylene ether glycol, polycaprolactone diol, polysiloxane diol and polypropylene glycol. The amine terminated polymer may be, for example, one or more of amine terminated polysiloxane, amine terminated polyethylene glycol and amine terminated polypropylene glycol.

The hard segment may be formed from:

at least one aromatic multifunctional isocyanate; and a chain extender having at least two functional groups capable of reacting with the isocyanate, at least one of the functional groups being a hydroxyl group attached to an aromatic ring.

The aromatic multifunctional isocyanate may be selected from, for example, toluene diisocyanate and methylene diphenyl diisocyanate. Chain extenders may include, for example, compounds such as 1,4-dihydroxyl benzene, 4-amino phenol, 1,3,5-trihydroxyl benzene, 2,4-dihydroxyl-N-(2-hydroxylethYl) benzamide, triethanol amine, 1,4-butane diol, 2-butene-1,4diol and 2-butyne-1,4-diol.

Polymers having elastic characteristics may be produced utilizing para-substituted phenylene chain extenders such as, for example, para-substituted diols or systems including one or more para-hydroxyl substituted phenylene groups. Such chain extenders may include, for example, 4,4'-isopropylidenediphenol and 1,4 dihydroxyl benzene. Aromatic chain extenders may also be blended with one or more aliphatic chain extenders such as, for example, aliphatic diols, cycloaliphatic diols and/or aliphatic triols.

The temperature at which the thermally reversible polymer dissociates may be increased or decreased by substituting the aromatic chain extender with one or more electron withdrawing substituents or electron donating substituents. Particularly useful electron withdrawing substituents include nitro groups, sulfonyl groups, cyano groups, esters, and amides. Particularly useful electron donating substitutents include alkoxy groups, alkyl groups, halides and tertiary amines.

In one aspect of the present invention the polymeric blend may be adapted to form chemical cross-links that are chemically stable and solvent resistant. Cross-linking may be accomplished by utilizing a trifunctional chain extender having at least one hydroxyl group attached to an aromatic ring and having other functional groups capable of reacting with an isocyanate which are not attached to the aromatic ring. For example, cross-linking may be accomplished utilizing aromatic triols having at least one hydroxyl group that is not attached to the aromatic ring. Mixtures of aliphatic triols and aromatic diols may also be used.

DETAILED DESCRIPTION OF THE INVENTION

The thermally reversible polymer of the present invention contains at least two soft segments joined by a hard segment that includes a thermally reversible bond. The polymer may contain additional soft segments that are united by one or more hard segments that may or may not have additional thermally reversible bonds. Each segment is described herein using segment components and by general formula. The hard segments having a thermally reversible bond may contain a thermally reversible aromatic urethane bond.

When the thermally reversible polymer contains hard segments including thermally reversible aromatic urethane bonds, the polymer may have the following general formula:

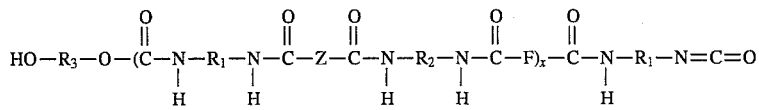

wherein $R_1$ is selected from aliphatic and aryl groups;

wherein $R_2$ is selected from aliphatic and aryl groups so that the polymer has at least one $R_2$ which is an aryl group having from 6 to about 18 carbon atoms, for example, $R_z$ may be an aromatic compound selected from, for example, phenyl, biphenyl and naphthyl;

x is an integer greater than 2; and

Z is a soft segment.

The soft segment Z typically represents from about 50 percent to about 98.5 percent, by weight, of the total composition. For example, the soft segment may represent from about 80 percent to about 95 percent, by weight, of the composition.

The soft segment may be described, for example, by the following formulas:

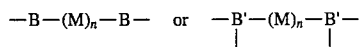

where B is selected from oxygen and sulfur and B' is nitrogen;

M is a repeating monomer unit such as, for example, an ether, ester, amide, olefin, carbonate, urea, urethane and siloxane; and n is an integer of from 3 to 300 so that the soft segment has a molecular weight greater than about 200, for example, from about 200 to about 25,000 as determined by gel permeation chromatography.

The hard segment of the thermally reversible polymeric composition typically represents from about 1.5 percent to about 50 percent, by weight, of the composition. For example, the hard segment may represent from about 2 percent to about 15 percent, by weight, of the composition.

When the hard segment includes a thermally reversible aromatic urethane bond, component F of the thermally reversible polymer depicts the chain extender which provides the hydroxyl portion of the urethane bond and may be represented by the following formulas:

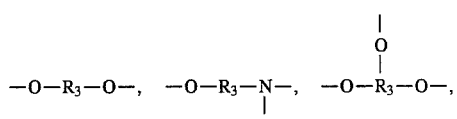

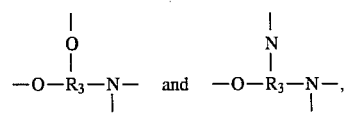

where $R_3$ is an aromatic group selected from, for example, sulfonyldiphenyl, amino phenyl, benzoic acid, phenyl acetic acid, thiodiphenyl, methyl phenyl, phenyl, biphenyl, and naphthyl.

Although the formula for component F depicts all the oxygen and/or nitrogen atoms pendant from the aromatic compound, only the oxygen atom which completes the urethane bond needs to be pendant to the aromatic groups in order to form a thermally reversible bond. The other oxygen and/or nitrogen atoms may be separated from the aromatic group by segments such as, for example, saturated and unsaturated alkyl chains and saturated and unsaturated cycloalkyl chains.

The aromatic group $R_3$ may be substituted with one or more electron donating substituents or electron withdrawing substitutents. Electron donating or electron withdrawing substituents affect the temperature at which the aromatic urethane bond evanesces and reverts. Although the inventors should not be held to a particular theory of operation, it is believed that the electron withdrawing substituents lower the temperature at which the thermally reversible aromatic urethane bond evanesces resulting in higher melt flow rates and lower processing temperatures for compositions containing such a thermally reversible bond. However, strong electron withdrawing substituents appear to diminish the rapid reversion of the evanesced bonds. Such an effect may be unsuitable in melt-processes where rapid formation of a polymer film, fiber or other material is desired. Exemplary electron withdrawing substituents include nitro groups, sulfonyl groups, cyano groups, acetyl groups, esters, and amides. Aromatic groups having electron withdrawing substituents include, for example, amino phenyl, benzoic acid, and phenyl acetic acid groups.

Electron donating substituents are believed to increase the temperature at which the thermally reversible aromatic urethane bond evanesces and increase the rapid reversion of evanesced bonds. Those substituents can be used to adjust the melt flow rate for a given processing temperature as well as to enhance the rapid formation of films, fibers or other products made of polymers containing such a substituted thermally reversible bond. Exemplary electron donating substituents include alkoxy groups, alkyl groups, halides and tertiary amines. Aromatic groups having electron donating substituents include, for example, thiodiphenyl, methyl phenyl and methoxy phenol groups.

The relation between the electron withdrawing or donating substituents of aromatic component F and the evanescence and reversion of thermally reversible aromatic urethane bonds is described to illustrate that compositions may be developed to suit the requirements of particular melt-processing methods such as, for example, melt-blowing processes, spun-bonding processes and film extruding processes. For example, compositions having low evanescence temperatures, high melt flow rates and rapid reversion of evanesced bonds may be desirable for many processes that produce polymer fibers such as, for example, melt-blowing or spun-bonding processes.

When the thermally reversible polymer contains a thermally reversible aromatic urethane bond, the reversible bonds may be formed by reacting an aromatic multifunctional isocyanate with an aromatic compound having at least one hydroxyl group attached to the aromatic ring. Generally speaking, most aromatic diols and/or triols, substituted aromatic diols and/or triols, mixed aromatic aliphatic alcohols, aromatic alcohols/amines, aromatic alcohols/thiols, and aromatic alcohols/carboxylic acids could be reacted with many aromatic isocyanates to generate the thermally reversible urethane bond.

Polymers containing thermally reversible urethane bonds are typically prepared by (1) reacting a hydroxyl terminated or amine terminated polymer with an aromatic multifunctional isocyanate; and (2) reacting the product from the first step with a chain extender having at least two functional groups capable of reacting with the isocyanate, at least one of the functional groups being a hydroxyl group attached to an aromatic ring.

Soft segments joined by hard segments without thermally reversible bonds are produced in the first reaction. Hard segments having thermally reversible urethane bonds are produced in the second reaction. The mole ratios of reactants should be adjusted to produce a final composition containing from about 50 to about 98.5 percent, by weight, soft segment and from about 1.5 to about 50 percent, by weight, hard segment.

The first reaction employs a mole ratio of aromatic multifunctional isocyanate to hydroxyl or amine-terminated polymer in the range of about 1.1 to about 50 and may be carried out at a temperature in the range of 75° C. to about 200° C. for a time sufficient for a generally complete reaction of the available reactants. Typically, the reaction temperature will be in the range from about 80° C. to about 180° C., for example, from about 120° C. to about 150° C. Reaction times depend upon reaction temperature and may range, for example, from about 1 to about 4 hours.

Exemplary hydroxyl-terminated polymers include polyethylene glycols having molecular weights of 3500, 8000, 14,000, and 20,000 available from the Union Carbide Corporation under the trade designation Carbowax; polyethylene adipate diol available from the Mobay Corporation under the trade designation Desmophen 2000; polytetramethylene ether glycol polymer having molecular weights of 1,000 and 2,000 available under the trade designation Terathane from E.I. DuPont de Nemours & Company, and polycaprolactone diol available from the Aldrich Chemical Company. Other useful hydroxylterminated polymers include polysiloxane diols and polypropylene glycols. Exemplary amine-terminated polymers include amine-terminated polypropylene glycols available under the trade designation Jeffamine D-2000 from the Texaco Chemical Company. Other useful amine-terminated polymers include, for example, amine terminated polyethylene glycols and amine-terminated polysiloxanes.

Each soft segment typically has a number average molecular weight ($M_n$) in the range from about 1,000 to about 25,000, as determined by gel permeation chromatography. For example, the molecular weight of a soft segment may be in the range from about 1,500 to about 3,000.

Certain physical properties of the thermally reversible polymer may be varied by changing the types of soft segments thus allowing the polymer to be tailored for different applications. For example, if a water-swellable polymer is desired, a polyethylene glycol soft segment may be used as one of the starting materials. Superabsorbent materials may be made utilizing polyethylene glycols having molecular weights between, for example, 8000 and 20,000. Thermoplastic elastomers can also be formed with soft segments such as, for example, polytetramethylene ether glycol, hydroxyl-terminated polyesters, polypropylene glycols, and hydroxyl-terminated polydimethylsiloxanes. The thermally reversible bond may be introduced into many types of polymeric systems such as, for example, one or more polyesters, nylons/polyamides, polyolefins, polycarbonates and polyureas.

Aromatic multifunctional isocyanates found to be useful include, for example, toluene-2,4-diisocyanate, toluene-2,6-diisocyanate, 4,4'-methylenebis(phenylisocyanate), m-phenylene diisocyanate, 4,4'-biphenylene diisocyanate, 3,3'-dichloro- 4,4'-biphenylene diisocyanate, xylene diisocyanate, chlorophenylene diisocyanate, diphenylmethane-4,4'-diisocyanate, or naphthalene-1,5-diisocyanate.

In the second reaction, the mole ratio of the first reaction product to aromatic chain extender is in the range from about 2 to about 100. This second reaction may be carried out at temperatures in the range from about 80° to 200° C. Typically, the reaction temperature will be from about 90° to about 150° C., for example, from about 110° to about 130° C.

The aromatic chain extender utilized in the second reaction should have at least two functional groups capable of reacting with the isocyanate and at least one of those groups should be a hydroxyl group attached directly to an aromatic ring. Exemplary chain extenders include aromatic diols having at least one hydroxyl group attached directly to the aromatic ring and mixtures of such aromatic diols and aliphatic diols. The chain extender may also include aromatic compounds having at least one hydroxyl group attached directly to an aromatic ring and one or more amino groups such as, for example, 2,4-dihydroxyl-N-( 2-hydroxylethyl) benzamide.

Polymers having elastic characteristics may be produced utilizing para-substituted phenylene diol chain extenders such as, for example, hydroquinone, methylhydroquinone, phenylhydroquinone, acetyl hydroquinone, 4,4'-isopropylidenediphenol, chlorohydroquinone, biphenol, methylene bisphenol and thiodiphenol. Polymers having elastic characteristics may also be produced utilizing derivatives of para-substituted phenol chain extenders such as, for example, 4-amino phenol, 4-hydroxylbenzoic acid, 4-hydroxyl phenyl acetic acid and 4-hydroxylbenzyl alcohol. Polymers having elastic characteristics may also be produced utilizing mixtures of 1,4-phenylene diol chain extenders or parasubstituted phenol derivatives and other aromatic and/or aliphatic diols. For example, elastic polymers may be prepared utilizing a mixture of 1,4-dihydroxyl benzene and 1,3- dihydroxyl benzene. Although the inventors should not be held to a particular theory of operation, it is believed that chain extenders which include para-substituted phenylene compounds or ring systems having one or more para-substituted phenylene groups increase the degree of crystallinity of the resulting polymer causing distinct phase separation between the hard and soft segments. It is believed that this phase separation imparts elastic properties to the polymer. Generally speaking, mixtures containing more than 50% by weight 1,4-phenylene diol or 1,4-phenylene diol derivatives result in polymers having elastic characteristics.

Certain thermoplastic materials such as, for example, conventional thermoplastic elastomeric polyurethanes may be swollen or dissolved by solvents such as, for example, tetrahydrofuran, acetone and halogenated hydrocarbons having from 1 to 6 carbon atoms. The thermally reversible polymers of the present invention may be adapted to form chemical cross-links which are chemically stable and solvent resistant. Cross-linked materials may be produced by utilizing a trifunctional chain extender having at least one hydroxyl group attached to an aromatic ring and having other functional groups not attached to the aromatic ring that are capable of reacting with an isocyanate. Suitable trifunctional chain extenders include, for example, 1,3,5-trihydroxylbenzene, 3,5-bis (hydroxylethoxy) phenol, and 2,4-dihydroxyl-N-(2-hydroxylethyl) benzamide.

The molecular weight of the thermally reversible polymers may range from about 40,000 to about 100,000. For example, from about 50,000 to about 75,000. Thermally reversible polymers have melt flow rates that range, for example, from about 450 grams per 10 minutes to about 1000 grams per 10 minutes because the thermally reversible aromatic urethane bonds evanesce above certain temperatures resulting in small, melt processable polymer fragments having molecular weights ranging from about 1,000 to about 25,000 which provide good melt flow characteristics. Conventional thermoplastic polymeric compositions may be formulated to have low molecular weights to provide similar melt flow rates but such low molecular weight compositions typically have very low strength.

EXAMPLES 1–14

The thermally reversible melt-pressed films of examples 1–14 were made by pressing a pellet of thermally reversible polymer between two pieces of Teflon™ coated aluminum foil at approximately 150° C. and 1000 psig using a Carver Laboratory Press Model 2518. Table 1 provides Grab Tensile Test results and Melt Flow Rate information for the thermally reversible melt pressed film samples prepared in Examples 1, 3, 6, 9 and 11. The Grab Tensile Tests were performed on a constant rate of extension tester, Instron Model 1122 Universal Testing Instrument, using 1 inch by 1 inch samples. The jaw faces of the tester were 1 inch wide by 3 inches long. The samples were weighed individually in grams. A 4 inch gauge length was used. Chart speed was set for 50 mm per minute and the crosshead speed was set for 200 mm per minute. The unit was zeroed, balanced and calibrated according to the standard procedure. Peak Load and Elongation were determined for each sample. The test equipment was set to report Peak Load in pounds force and Elongation in percent.

Peak Load as used herein is defined as the maximum load or force encountered in elongating the sample to break. Peak Load is expressed in units of force ($lbs_f$).

Elongation as used herein is defined as the relative increase in length of a specimen during the tensile test. Elongation is expressed as a percentage, i.e., [(increase in length)/(original length)]×100.

EXAMPLE 1

A resin kettle equipped with mechanical stirrer, a thermometer and a nitrogen inlet was charged with 100 g (0.05 mole) of polytetramethylene ether glycol having a molecular weight of 2,000 available under the trade designation Terathane from E.I. DuPont de Nemours & Company and 50 g (0.2 mole) of 4,4'-methylenebis (phenylisocyanate) aromatic multifunctional isocyanate available from Eastman Kodak. The mixture was stirred at 120° C. for two hours. The temperature of the reaction mixture was raised to 150° C. and then a mixture of 11.4 g (0.05 mole) of 4,4'-isopropylidenediphenol aromatic chain extender and 9 g (0.1 mole) of 1,4-butanediol aliphatic chain extender was added. The reaction mixture was stirred at this temperature for one hour and then poured into a Teflon™ coated aluminum foil pan. This polymer contained 66 percent, by weight, soft segment and 34 percent, by weight, hard segment. Grab Tensile Test results and Melt Flow Rate information for this material is given in Table 1.

EXAMPLE 2

The procedure of Example 1 was repeated, except that only 4,4'-isopropylidene diphenol was used as the chain extender in forming the thermally reversible polymer. The amount of polytetramethylene ether glycol used was 300 g (0.15 mole). This polymer contained 93.3 percent, by weight, soft segment and 6.7 percent, by weight, hard segment.

EXAMPLE 3

The procedure of Example 2 was repeated, except that methylhydroquinone aromatic chain extender was used in place of 4,4'-isopropylidene diphenol aromatic chain extender. This polymer contained 94.7 percent, by weight, soft segment and 5.3 percent, by weight, hard segment. Grab Tensile Test results and Melt Flow Rate information for this material is given in Table 1.

EXAMPLE 4

A resin kettle equipped with mechanical stirrer, a thermometer and a nitrogen inlet was charged with 180 g (0.18 mole) of polytetramethylene ether glycol (PTMEG) having a molecular weight of 1,000 and 47.5 g (0.19 mole) of 4,4'-methylene bis(phenylisocyanate) (MDI) aromatic multifunctional isocyanate. The mixture was stirred for 1.5 hours at 120° C. Approximately 1.4 g (0.01 mole) of 4-hydroxylbenzyl alcohol aromatic chain extender was added to the mixture. The reaction mixture was stirred vigorously for 5 minutes at 120° C. and then poured into a Teflon™ coated pan and heated in a vacuum oven at 120° C. for two hours. The polymer obtained contained 98.2 percent, by weight, soft segment and 1.8 percent, by weight, hard segment.

EXAMPLE 5

The procedure of Example 4 was repeated, except that the amount of polytetramethylene ether glycol was changed. In this example, approximately 35 g (0.035 mole) of PTMEG, 37.5 g (0.15 mole) of MDI aromatic multifunctional isocyanate and 14.3 g (0.115 mole) of 4-hydroxylbenzyl alcohol aromatic chain extender were used in the reaction.

EXAMPLE 6

The procedure of Example 4 was repeated, except that 4-aminophenol aromatic chain extender was used in place of 4-hydroxylbenzyl alcohol. This polymer contained 98.5 percent, by weight, soft segment and 1.5 percent, by weight, hard segment. Grab Tensile Test results and Melt Flow Rate information for this material is given in Table 1.

EXAMPLE 7

A thermally reversible polymer was prepared using an amine terminated polypropylene glycol having a molecular weight of 2,000 available under the trade designation JEFFAMINE D-2000 from the Texaco Chemical Company. The procedure used in Example 4 was repeated, except that an amine terminated polypropylene glycol was reacted with 4,4'-methylene bis(phenylisocyanate) (MDI) aromatic multifunctional isocyanate and 4-hydroxylbenzyl alcohol aromatic chain extender to form polyetherurethane urea.

EXAMPLE 8

A polymer was prepared using polycaprolactone diol having a molecular weight of 2,000. The procedure used in Example 4 was repeated, except that polypcaprolactone diol was used instead of PTMEG.

EXAMPLE 9

A polymer having chemical cross-links was prepared according to the procedure of Example 4 except that a trifunctional chain extender having at least one hydroxyl group attached to an aromatic ring was used. Approximately 70 g (0.035 mole) of polycaprolactone diol was mixed with 37.5 g (0.15 mole) of MDI aromatic multifunctional isocyanate and reacted for two hours at 120° C. and then 1.4 g (0.015 mole) of 1,4-butanediol aliphatic chain extender and 13.0 g (0.066 mole) of 2,4-dihydroxyl-N-( 2-hydroxyethyl)benzamide aromatic trifunctional chain extender were added together to the stirring mixture. Grab Tensile Test and Melt Flow Rate information for this material is in Table 1.

EXAMPLE 10

A polymer having chemical cross-links was prepared using an amine terminated polypropylene glycol. A resin kettle equipped with a mechanical stirrer, a thermometer and a nitrogen inlet was charged with 70 g (0.035 mole) of an amine terminated polypropylene glycol having a molecular weight of 2000 available under the trade designation JEFFAMINE D-2000 from the Texaco Chemical Company and 37.5 g (0.15 mole) of MDI aromatic multifunctional isocyanate. The mixture was stirred for 1 hour at 102° C. after which 12.4 g (0.1 mole) of methylhydroquinone aromatic chain extender and 1.5 g (0.01 mole) of triethanol amine aliphatic chain extender were added to the mixture.

EXAMPLE 11

A polymer having relatively few thermally reversible bonds was prepared according to the procedure of Example 4 but with a low level of aromatic chain extender. The reaction mixture contained approximately 225 g (0.225 mole) of polytetramethylene ether glycol (PTMEG) having a molecular weight of 1,000; 100 g (0.4 mole) of 4,4'-methylene bis(phenylisocyanate) (MDI) aromatic multifunctional isocyanate; 13.5 g (0.15 mole) 1,4-butanediol aliphatic chain extender and 2.8 g (0.025 mole) 3-hydroxylphenol (resorcinol) aromatic chain extender. The resulting polymer contained approximately 3 mole percent aromatic chain extender which resulted in a low level of thermally reversible bonds. The polymer also contained 17.6 percent by weight hard segment and 82.4 percent by weight soft segment. The Melt Flow Rate and 3-hydroxylphenol (resorcinol) aromatic chain extender content are given in Table 2.

EXAMPLE 12

Following the procedure of Example 4 a polymer was prepared from a reaction mixture containing approximately 200 g (0.2 mole) of polytetramethylene ether glycol (PTMEG) having a molecular weight of 1,000; 100 g (0.4 mole) of 4,4'-methylene bis(phenylisocyanate) (MDI) aromatic multifunctional isocyanate; 13.5 g (0.15 mole) 1,4-butanediol aliphatic chain extender and 5.5 g (0.05 mole) 3-hydroxylphenol (resorcinol) aromatic chain extender. The resulting polymer contained approximately 6.3 mole percent aromatic chain extender. The polymer also contained 21.6 percent by weight hard segment and 78.4 percent by weight soft segment. The Melt Flow Rate and 3-hydroxylphenol (resorcinol) aromatic chain extender content are given in Table 2.

EXAMPLE 13

Following the procedure of Example 4 a polymer was prepared from a reaction mixture containing approximately 175 g (0.175 mole) of polytetramethylene ether glycol (PTMEG) having a molecular weight of 1,000; 100 g (0.4 mole) of 4,4'-methylene bis(phenylisocyanate) (MDI) aromatic multifunctional isocyanate; 13.5 g (0.15 mole) 1,4-butanediol aliphatic chain extender and 8.3 g (0.075 mole) 3-hydroxylphenol (resorcinol) aromatic chain extender. The resulting polymer contained approximately 9.4 mole percent aromatic chain extender. The polymer also contained 26.3 percent by weight hard segment and 73.7 percent by weight soft segment. The Melt Flow Rate and 3-hydroxylphenol (resorcinol) aromatic chain extender content are given in Table 2.

EXAMPLE 14

A polymer was prepared according to the procedure of Example 4. The reaction mixture contained approximately 150 g (0.15 mole) of polytetramethylene ether glycol (PTMEG) having a molecular weight of 1,000; 100 g (0.4 mole) of 4,4'-methylene bis(phenylisocyanate) (MDI) aromatic multifunctional isocyanate; 13.5 g (0.15 mole) 1,4-butanediol aliphatic chain extender and 11 g (0.1 mole) 3-hydroxylphenol (resorcinol) aromatic chain extender. The resulting polymer contained approximately 12.5 mole percent aromatic chain extender. The polymer also contained 31.7 percent by weight hard segment and 69.3 percent by weight soft segment. The melt flow rate and 3-hydroxylphenol (resorcinol) aromatic chain extender content are given in Table 2.

RELATED APPLICATIONS

This application is one of a group of commonly assigned patent applications which are being filed on the same date. The group includes the present application; application Ser. No. 07/341,457 in the name of F. C. Onwumere et al., and entitled "Thermally Reversible Polymer Sheets and Methods of Forming the Same" ; and U.S. Pat. No. 5,047,456 entitled "Thermally Reversible Superabsorbent Polymers" and also in the name of F. C. Onwumere et al. The subject matter of these applications is hereby incorporated by reference.

Disclosure of the presently preferred embodiment of the invention is intended to illustrate and not to limit the invention. It is understood that those of skill in the art should be capable of making numerous modifications without departing from the true spirit and scope of the invention.

TABLE 1

Tensile Test and Melt Flow Rate Data

| Examples | Material | Strength (Psi) (a) | % Elongation | Melt Flow Rate (g/10 min) 180° C. | 190° C. |
|---|---|---|---|---|---|
| 1 | | 3000 | 280 | 85 | 145 |
| 3 | | 3650 | 285 | 469 | 640 |
| 6 | | 4540 | 230 | 425 | — |
| 9 | | 4435 | 220 | 30 | 137 |
| 11 | | 3589 | 250 | 190 | 784 |

(a) Films of thickness 0.45 mm and cross-sectional area 0.017 in$^2$ were meltpressed on a Carver Laboratory Press model 2518.

TABLE 2

Melt Flow Rate as a Function of Resorcinol Content

| MOLES | | | | MOLE % | MELTFLOW RATE (G/10 MIN) | | | |
|---|---|---|---|---|---|---|---|---|
| PTMEG | MDI | BDO | RES | RES | 170° C. | 180° C. | 190° C. | 200° C. |
| 0.225 | 0.4 | 0.15 | 0.025 | 3 | — | — | — | 17 |
| 0.200 | 0.4 | 0.15 | 0.050 | 6 | — | — | 25 | 126 |
| 0.175 | 0.4 | 0.15 | 0.075 | 9 | — | 83 | 297 | xx |
| 0.150 | 0.4 | 0.15 | 0.100 | 12 | 98 | 190 | 784 | xx |

Key
— Difficult to extrude
xx Difficult to determine accurately
PTMEG polytetramethylene ether glycol
MDI 4,4'-methylene bis(phenylisocyanate)
BDO 1,4-butanediol
RES resorcinol

What is claimed is:

1. A thermally reversible polymer adapted for use in meltblowing, spunbonding and film extrusion processes, the polymer comprising:

from about 50 percent to about 98.5 percent by weight, of a soft segment selected from the group including amine terminated polysiloxane, amine terminated polyethylene glycol and amine terminated polypropylene glycol; and from about 1.5 percent to about 50 percent, by weight, of a hard segment consisting of:
at least one aromatic multifunctional isocyanate; and
a chain extender having at least two functional groups capable of reacting with the isocyanate, at least one of the functional groups being a hydroxyl group attached to an aromatic ring, so that said polymer is adapted, upon being heated to an elevated temperature, to dissociate into melt processable polymeric fragments having a melt flow rate ranging from about 450 grams per 10 minutes to about 1000 grams per 10 minutes and upon being cooled to ambient temperature, to reassociate.

* * * * *